(12) United States Patent
Logsdon et al.

(10) Patent No.: US 11,932,317 B2
(45) Date of Patent: Mar. 19, 2024

(54) SYSTEM AND METHOD OF REDUCING AERODYNAMIC DRAG OF GROUND VEHICLES

(71) Applicant: FORE TRANSIT INC., San Francisco, CA (US)

(72) Inventors: Ryan Matthew Logsdon, Pasadena, CA (US); Radin Rahimzadeh, San Francisco, CA (US)

(73) Assignee: FORE TRANSIT INC., San Francisco, CA (US)

( * ) Notice: Subject to any disclaimer, the term of this patent is extended or adjusted under 35 U.S.C. 154(b) by 198 days.

(21) Appl. No.: 17/558,647

(22) Filed: Dec. 22, 2021

(65) Prior Publication Data
US 2022/0194492 A1    Jun. 23, 2022

Related U.S. Application Data

(60) Provisional application No. 63/129,955, filed on Dec. 23, 2020.

(51) Int. Cl.
*B62D 35/00*    (2006.01)
*B62D 37/02*    (2006.01)

(52) U.S. Cl.
CPC ............ *B62D 35/001* (2013.01); *B62D 37/02* (2013.01)

(58) Field of Classification Search
CPC ...... B62D 35/00; B62D 35/001; B62D 37/02; B62D 35/008
See application file for complete search history.

(56) References Cited

U.S. PATENT DOCUMENTS

| | | | | |
|---|---|---|---|---|
| 4,180,290 A | * | 12/1979 | Drews | B62D 35/00 244/130 |
| 4,284,302 A | * | 8/1981 | Drews | B62D 35/00 296/180.1 |
| 4,320,919 A | * | 3/1982 | Butler | B62D 35/001 296/180.1 |
| 4,343,506 A | * | 8/1982 | Saltzman | B62D 35/001 296/180.2 |

(Continued)

FOREIGN PATENT DOCUMENTS

| | | |
|---|---|---|
| CN | 203511801 U | 4/2014 |
| JP | 6435434 B1 | 12/2018 |

(Continued)

OTHER PUBLICATIONS

Office Action dated Jun. 6, 2023 in corresponding U.S. Appl. No. 17/533,732.

(Continued)

*Primary Examiner* — Lori Lyjak
(74) *Attorney, Agent, or Firm* — NovoTechIP International PLLC

(57) ABSTRACT

A system and method for reducing an amount of aerodynamic drag generated within a rear area of a vehicle includes positioning or manufacturing a plurality of devices in a selected pattern on at an exterior surface of the vehicle or a surface of an accessory attached to the vehicle, where each of the plurality of devices includes a flat surface and one or more non-flat surfaces, and the plurality of devices cause an airstream traveling along the side of the vehicle to curve behind the vehicle and provide a push in the forward direction.

20 Claims, 7 Drawing Sheets

(56) References Cited

U.S. PATENT DOCUMENTS

| | | | |
|---|---|---|---|
| 4,779,915 A | 10/1988 | Straight | |
| 4,789,117 A * | 12/1988 | Paterson | F42B 10/22 |
| | | | 296/180.1 |
| 5,058,837 A | 10/1991 | Wheeler | |
| 5,108,145 A * | 4/1992 | Harris | B62D 35/001 |
| | | | 296/180.1 |
| 5,240,306 A * | 8/1993 | Flemming | B62D 35/004 |
| | | | 296/180.4 |
| 5,289,997 A * | 3/1994 | Harris | B62D 35/001 |
| | | | 296/180.1 |
| 5,378,524 A * | 1/1995 | Blood | F42B 10/22 |
| | | | 428/156 |
| 6,131,853 A | 10/2000 | Bauer et al. | |
| 6,224,141 B1 * | 5/2001 | Brodlo | B62D 35/008 |
| | | | 296/180.1 |
| 6,276,636 B1 * | 8/2001 | Krastel | B62D 35/00 |
| | | | 296/180.1 |
| 6,378,932 B1 | 4/2002 | Fasel et al. | |
| 6,634,700 B1 * | 10/2003 | Calvert | B62D 35/00 |
| | | | 296/180.1 |
| 7,192,077 B1 * | 3/2007 | Hilleman | B62D 35/001 |
| | | | 296/180.1 |
| 7,255,387 B2 | 8/2007 | Wood | |
| 7,357,442 B1 * | 4/2008 | Drews | B62D 35/00 |
| | | | 296/180.1 |
| 7,810,867 B2 * | 10/2010 | Salaverry | B62D 35/00 |
| | | | 296/180.1 |
| 7,922,235 B1 | 4/2011 | Smith | |
| 8,579,360 B2 * | 11/2013 | Litchfield | B62D 35/001 |
| | | | 296/180.1 |
| RE44,755 E | 2/2014 | Surti | |
| 8,801,078 B2 | 8/2014 | Brown et al. | |
| D776,026 S * | 1/2017 | Ellis | D12/181 |
| 9,834,267 B1 * | 12/2017 | Hanagan | B62D 35/00 |
| 10,843,746 B1 * | 11/2020 | Stinchcomb | B62D 35/001 |
| 2002/0109375 A1 | 8/2002 | Hung | |
| 2003/0011210 A1 * | 1/2003 | Cory | B62D 35/001 |
| | | | 296/180.1 |
| 2006/0134379 A1 * | 6/2006 | Pulkka | B64C 21/10 |
| | | | 428/141 |
| 2007/0120397 A1 * | 5/2007 | Layfield | B62D 35/001 |
| | | | 296/180.4 |
| 2007/0246969 A1 * | 10/2007 | Smith | B62D 35/001 |
| | | | 296/180.2 |
| 2009/0230725 A1 * | 9/2009 | Juieng | B62D 35/00 |
| | | | 296/1.01 |
| 2010/0090496 A1 * | 4/2010 | Carlson | B62D 35/00 |
| | | | 296/180.1 |
| 2010/0225143 A1 | 9/2010 | Skopic | |
| 2010/0301632 A1 * | 12/2010 | Bryne | A43B 5/14 |
| | | | 296/180.1 |
| 2011/0115254 A1 * | 5/2011 | Skopic | B62D 35/001 |
| | | | 296/180.3 |
| 2011/0175393 A1 | 7/2011 | Cline | |
| 2011/0175395 A1 * | 7/2011 | Guigne | B62D 35/001 |
| | | | 296/180.3 |
| 2011/0181072 A1 | 7/2011 | Kempster | |
| 2011/0204677 A1 * | 8/2011 | Wood | B62D 35/001 |
| | | | 296/180.1 |
| 2012/0038183 A1 * | 2/2012 | Brewer | B62D 35/001 |
| | | | 296/180.1 |
| 2012/0255152 A1 | 10/2012 | Evans | |
| 2013/0228236 A1 | 9/2013 | Evans | |
| 2014/0167447 A1 | 6/2014 | Meredith et al. | |
| 2014/0252799 A1 * | 9/2014 | Smith | B62D 35/001 |
| | | | 296/180.4 |
| 2014/0265438 A1 * | 9/2014 | Kronemeyer | B62D 35/001 |
| | | | 296/180.4 |
| 2014/0375079 A1 | 12/2014 | Evans | |
| 2015/0251711 A1 * | 9/2015 | Carlson | B62D 35/00 |
| | | | 296/180.1 |
| 2015/0370252 A1 | 12/2015 | Hanson et al. | |
| 2016/0016616 A1 | 1/2016 | Bacon | |
| 2017/0282982 A1 * | 10/2017 | Nagasawa | B62D 37/02 |
| 2018/0226917 A1 * | 8/2018 | Jacques | E04B 2/72 |
| 2018/0312203 A1 * | 11/2018 | Smith | B62D 35/001 |
| 2020/0023911 A1 * | 1/2020 | Otterstrom | B62D 35/02 |
| 2021/0094630 A1 * | 4/2021 | Watanabe | B62D 35/00 |
| 2021/0094633 A1 * | 4/2021 | Watanabe | F15D 1/0075 |
| 2021/0188373 A1 | 6/2021 | Chung | |
| 2021/0203177 A1 | 7/2021 | Peng | |
| 2021/0231141 A1 * | 7/2021 | Smith | B64C 21/10 |

FOREIGN PATENT DOCUMENTS

| | | |
|---|---|---|
| WO | 2012138841 A2 | 10/2012 |
| WO | 2019117051 A1 | 6/2019 |

OTHER PUBLICATIONS

Notice of Allowance dated Oct. 17, 2023 in corresponding U.S. Appl. No. 17/533,732.

* cited by examiner

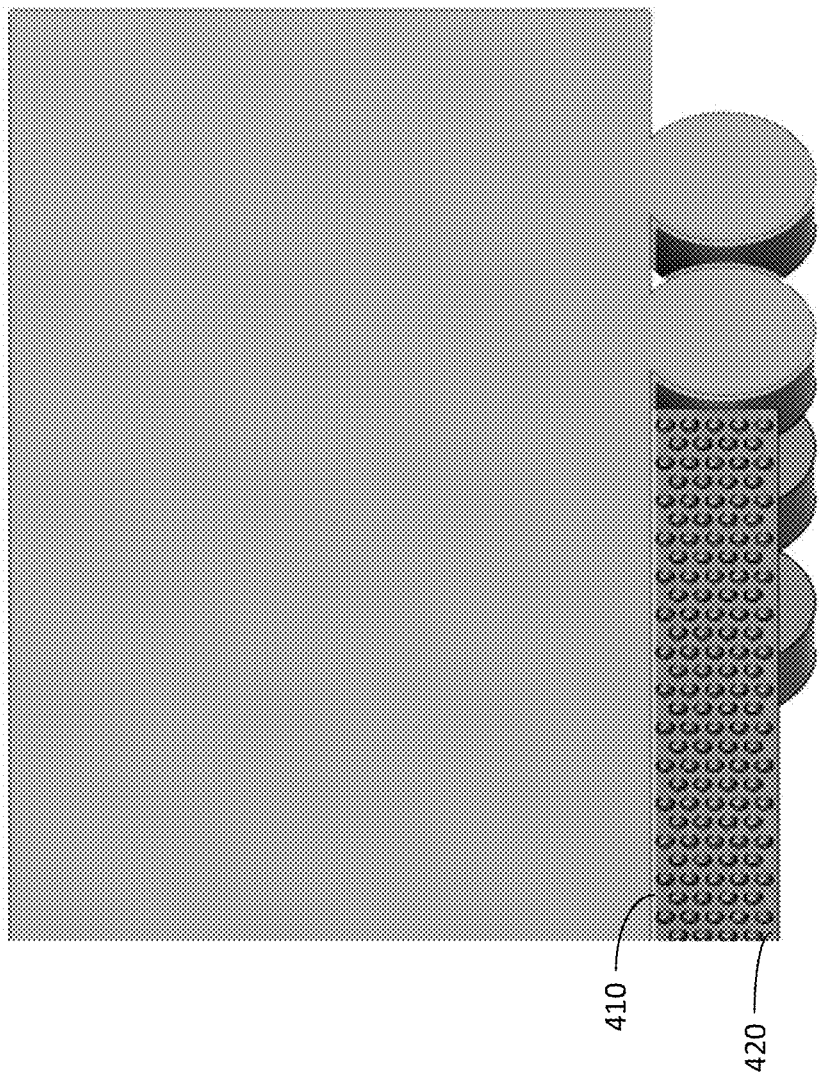

SYSTEM AND METHOD OF REDUCING AERODYNAMIC DRAG OF GROUND VEHICLES

TECHNICAL FIELD

This disclosure relates generally to reduction of aerodynamic drag for ground vehicles, and, more particularly, to a method of and system for reduction of aerodynamic drag by utilizing one or more devices configured to control the air flow and the pressure gradients surrounding a moving ground vehicle.

BACKGROUND

As ground vehicles move forward while penetrating through the air, their movement creates a significant amount of aerodynamic drag on the vehicles. To continue moving forward, a substantial amount of force is needed to overcome the drag. This amount of force, however, requires additional energy, and as such, results in increased fuel and energy consumption. This is particularly the case for large ground vehicles and/or those traveling at high speeds, which require more energy to overcome the aerodynamic drag.

To address this problem, there have been several incremental changes to vehicle designs in addition to a number of after-market products. These changes and products are often designed for improving aerodynamic drag efficiencies of vehicles, particularly ground vehicles and vehicles used in the heavy-truck industry. However, most of these design changes and products either fall short in efficiently reducing aerodynamic drag or they suffer from other shortcomings.

One commonly used after-market product for reducing the aerodynamic drag of a ground vehicle is a trailer side skirt that can be attached to the trailer body of ground transportation vehicles such as trailers, trucks, and semi-trailers. One configuration of the trailer side skirt is a straight and flat surfaced trailer side skirt which can reduce the rear wake of the vehicle to which it is attached by causing the air to travel upwards and breaking the wake into smaller sizes as the wake exits behind the vehicle. When the side skirt is attached to the sides of a trailer, it can create a separation in the flows of air from the sides and underneath of the vehicle. This may prevent the exchange of air into different pressure gradients, thus creating a uniform path of travel for the surrounding air to follow. The new path of uniform travel for air can reduce the amount of turbulence encountered by the vehicle. As a result, use of a side skirt can reduce the amount of aerodynamic drag affecting the vehicle.

A later modification of the straight and flat surfaced side skirt is the angled or tapered in installation of the traditional side skirt on a vehicle's trailer. An angled side skirt can create a smaller wake size than a straight side skirt. That is because the angled side skirt directs the air to make a sharper upwards turn and as such causes the air to travel further upward. Both the straight and angled side skirt systems are designed to control the flow of air from entering the undercarriage region. While these side skirts may reduce the amount of aerodynamic drag generated underneath the vehicle, they do not substantially affect the amount of aerodynamic drag behind the vehicle. As such, these devices fail to adequately address energy consumption as a result of aerodynamic drag on ground vehicles.

Hence, there is a need for improved systems and methods of efficiently reducing aerodynamic drag for a moving ground vehicle.

SUMMARY

In one general aspect, the instant disclosure presents a method for reducing an amount of aerodynamic drag generated within a vicinity of a moving vehicle. The method may include positioning or manufacturing a plurality of devices in a selected pattern on an exterior surface of the vehicle or a surface of an accessory attached to the vehicle, wherein each of the plurality of devices includes a flat surface and one or more non-flat surfaces, and the plurality of devices cause an airstream traveling along the side of the vehicle to curve behind the vehicle and provide a push in the forward direction.

In another general aspect, the instant disclosure presents a system for reducing an amount of aerodynamic drag generated within a vicinity of a moving vehicle. The system may include a plurality of devices for attaching to or manufacturing on at least one of an exterior surface of the vehicle or a surface of a vehicle accessory attached to the vehicle, each of the plurality of devices comprising a flat surface and one or more non-flat surfaces, and the plurality of devices positioned in a pattern on the exterior surface of the vehicle, wherein the plurality of devices cause an airstream traveling along the side of the vehicle to curve behind the vehicle and provide a push in the forward direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4B depict examples of patterns in which non-flat devices for reducing aerodynamic drag of ground vehicles can be installed on vehicle attachments, fairings and/or accessories.

DETAILED DESCRIPTION

Figure 1A:
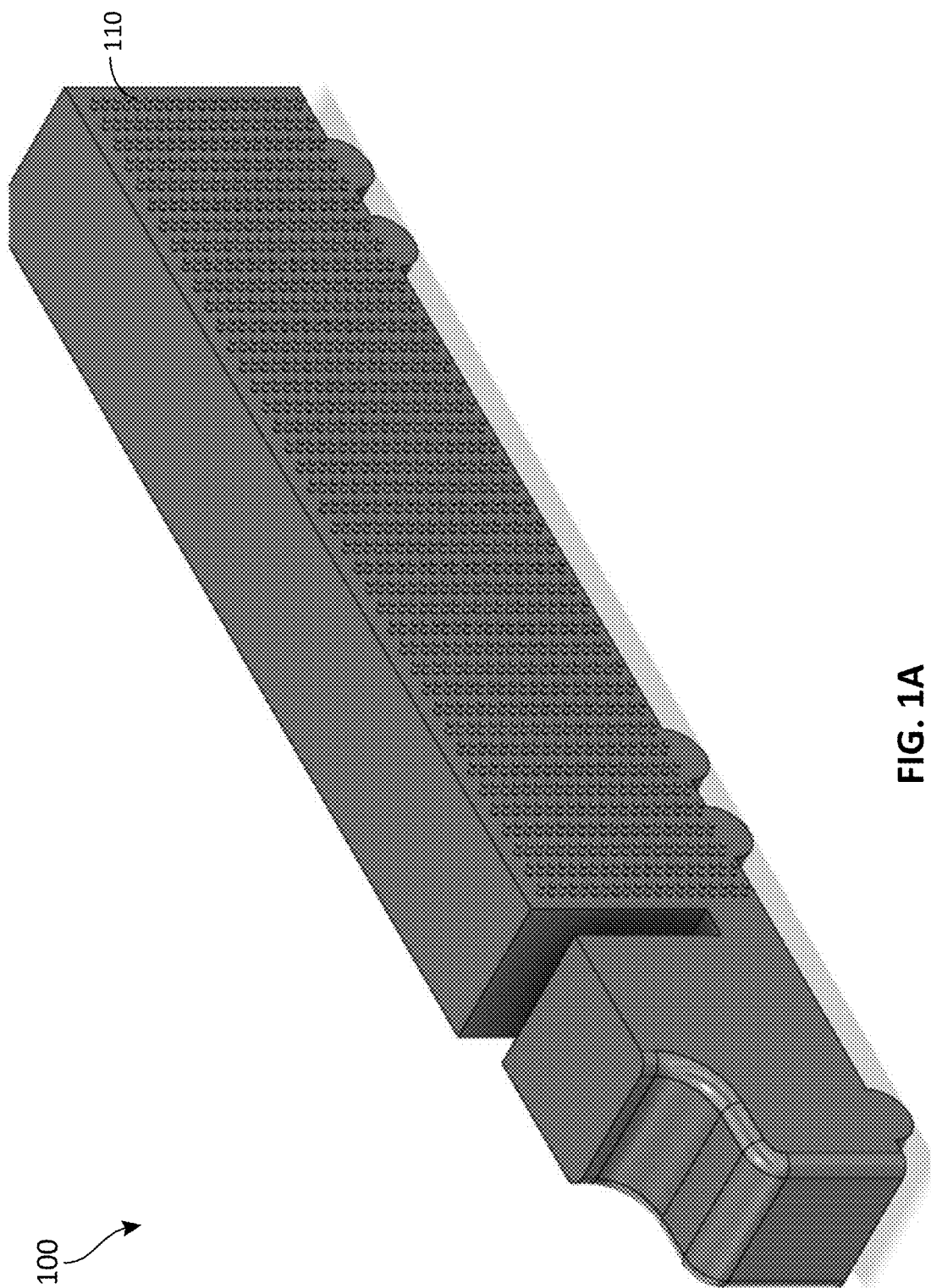
FIGS. 1A-1B depict examples of patterns in which non-flat devices for reducing aerodynamic drag of ground vehicles can be installed on the body of the vehicle and/or trailer.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Aerodynamic drag is a substantial source of fuel and energy usage in ground vehicles. This is particularly the case for large vehicles and those moving at high speeds such as trucks and other cargo carrying vehicles. When a forward moving vehicle meets air resistance, there is an impact on the frontal face of the vehicle. This pushes the vehicle backwards and causes the air streams to spread around the vehicle. This spread leads to unsteady turbulence around the vehicle. Furthermore, the spread causes flow separation, leading to a large, slow-moving air pocket at the rear of the vehicle. This pocket of air is referred to as a "wake" in this disclosure. The wake features a pressure difference that exerts a pulling force on the rear of the vehicle. Together, the push at the front and the pull at the rear result in a drag pressure that is counter to the intended direction of the vehicle. To overcome this drag pressure, the vehicle would need to exert more power, thus resulting in additional fuel and energy consumption. Furthermore, the unstable turbulence caused by flow separation leads to the vehicle shaking and therefore, deteriorating the vehicle's stability.

While certain devices and improvements have been made over the years to reduce some of the aerodynamic drag on large vehicles, current devices do not adequately address the amount of wake generated around the rear end of the vehicles. Furthermore, some of the currently used devices add substantial weight to the vehicle, require maintenance and/or require the driver's involvement in employing the device. As such, none of the currently available devices provide an easy to use, lightweight, inexpensive and efficient mechanism for reducing the amount of wake and turbulence generated by a moving ground vehicle.

To address these problems and others, in an example, this description offers a solution by providing lightweight, easy to install and easy to operate non-flat devices that reduce the amount of aerodynamic drag and unstable turbulence generated around the vehicle, while also decreasing the amount of unstable turbulence generated around the vehicle. In one implementation, this is achieved by utilizing a plurality of non-flat devices that can be installed on the body of the vehicle in a variety of patterns. In an example, a non-flat device includes one or more curve-shaped surfaces. In addition to being applied to the body of the vehicle, the non-flat devices may be applied to or manufactured on aerodynamic aftermarket attachments, fairings and accessories. The non-flat devices may have varying geometries. In some implementations, the non-flat devices may take the form of a hemisphere, a hemisphere-like shape, or a hemisphere-like shape with the cross section of a cycloid. The hemisphere-like shapes may operate as both protruding, convex geometries as well as inverted, concave geometries. In other implementations, the non-flat devices resemble a wave without a breaking crest, an ancient battle helmet (e.g., the shape of the helmet in the "Man in Armour Holding a Pike"/"Mars Vigilant" painting by Jan van Bijlert), or any other combination of shapes grouped together. The term "non-flat" as used in this disclosure may refer to any raised or dented surface having a portion resembling a curve. The curve may be actuated by using one or more curved surface or by using straight lines that approximate closely to a curved shape.

The non-flat devices may alter the pressure gradients surrounding the vehicle and create a faster path for the air to travel. This may be achieved by constricting the air streams surrounding the vehicle and pulling them closer to the sides of the vehicle. When applied to aftermarket accessories, the non-flat devices may cause the flow of air to travel upwards along the laterals of the vehicle and turn inwards towards the rear of the vehicle. This may lead to a forward assistive push on the rear end of the vehicle that provides a push in the vehicle's direction of travel and may thus reduce the force of the wake. Thus, the air streams from above and below the vehicle may be able to continue their trajectories unabated and curl more directly into the rear face of the vehicle, providing an assistive push in the vehicle's direction of travel.

Furthermore, the non-flat geometries may use the Coandă effect to keep the air from turning turbulent while increasing the surface area of the vehicles. This may be advantageous because the drag force equation dictates that increasing the frontal surface area of the vehicle while keeping the amount of the forces the same decreases the drag coefficient. Thus, increasing the surface area results in a smaller drag force. In practice, the number of forces changes slightly as an additional force of friction may need to be taken into account. However, the increase in friction is much less than the overall decrease in the amount of force that stems from the smaller drag coefficient. Thus, the overall result is a reduced drag force.

The varying geometries of the non-flat devices may also create a brachistochrone curve effect where the non-flat shapes allow the air to travel faster along the same path. Creating a brachistochrone geometry in the body, sides, and/or face of the vehicle or accessories, attachments, and fairings of the vehicle, results in the airstreams traveling from any starting point of the brachistochrone curve to its end point (e.g., front to rear) faster than they would have normally traveled given a straight path. Considering the other physical frame of reference, where the vehicle moves through the air rather than the air moving along the vehicle, the vehicle is able to move through the air faster with a brachistochrone geometry applied to its body or attached to its aerodynamic accessories. Given a constant speed for the vehicles with and without brachistochrone geometries, the vehicle with a brachistochrone geometry is able to exert less force to move at the same speed, thereby reducing its energy consumption. This results in a reduction in fuel and energy consumption and thus better fuel and energy economy for a moving ground vehicle.

In some implementations, to achieve the desired results, a plurality of the non-flat devices is applied or manufactured on the lateral, top, and or bottom sides of a ground vehicle, or the sides of existing after-market aerodynamic accessories, attachments, and fairings such as the side skirt. The non-flat devices may be installed individually or secured as a system. Whether attached individually or as a system, the devices may be attached to the vehicle or aftermarket accessory in any manner such as a uniform grid or placed in the shape of an offset grid pattern (e.g., diamond-like layout). In some implementations, the offset grid pattern provides an optimal result. In an example, the pattern is omnidirectional. In other examples, non-flat devices with different specialized geometries are aligned parallel to the direction of air flow. The attachment pattern may depend on the geometry of the vehicle.

The mechanisms offered herein provide a maintenance-free or low-maintenance device that does not interfere with regular operational procedures of the vehicles and/or does not require additional operational steps to ensure successful operation. Furthermore, the non-flat devices maintain a low profile on the area to which they are applied. As such, the non-flat devices discussed herein may be used to reduce aerodynamic drag of all existing and future vehicles (e.g., cars with trailers, tractor-trailers, trucks, trains, buses, etc.).

As will be understood by persons of skill in the art upon reading this disclosure, benefits and advantages provided by such implementations can include, but are not limited to, a solution to the problem of substantial wake and aerodynamic drag on ground vehicles. Technical solutions and implementations provided herein provide a mechanism for reducing the aerodynamic drag around the rear end of the vehicle efficiently, without substantially increasing the weight of the vehicle. Furthermore, the solutions provided herein provide an inexpensive, easy to apply, and easy to operate mechanism that does not hinder the operational performance of the vehicle. The benefits made available by these solutions include increasing fuel or energy efficiency at an affordable cost, and thus providing environmental and cost-saving benefits.

The present disclosure should be considered as illustrative and not restrictive in character. It is understood that only certain embodiments have been presented and that all changes, modifications, and further applications that come within the spirit of the disclosure are desired to be protected. It should be noted that while a truck may be used as an example vehicle in this disclosure, the scope of the present disclosure is not limited to medium and heavy-duty trucks and is applicable for all modes of ground transportation vehicles to reduce the drag of all existing and future ground vehicles (e.g., cars with trailers, tractor-trailer trucks, trains, buses, heavy-duty vehicles, medium-duty vehicles, etc.). The placement of the devices disclosed herein may be adapted to the geometry of the vehicle.

Figure 1B:
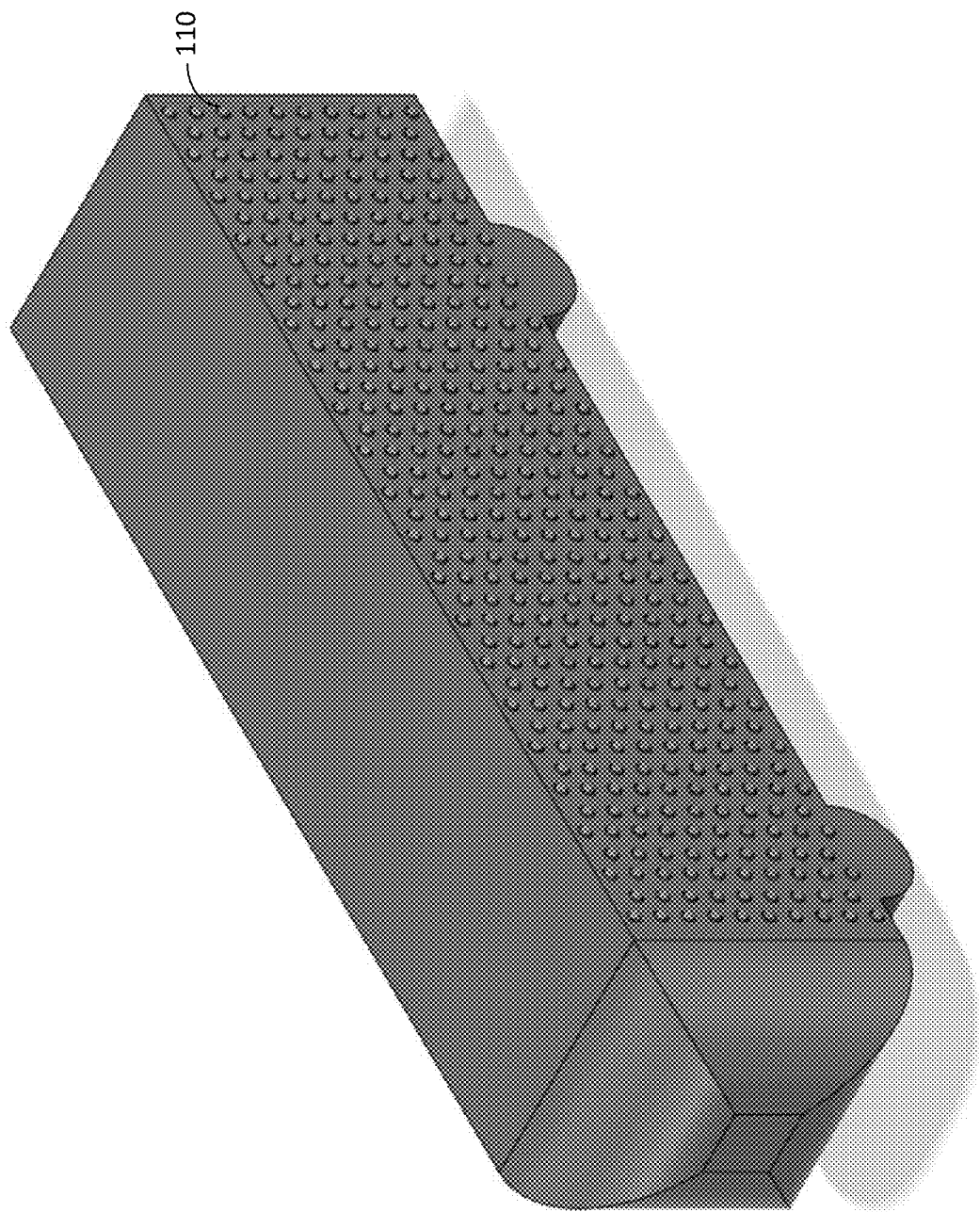

FIGS. 1A-1B illustrate examples of patterns in which non-flat devices for reducing aerodynamic drag of ground vehicles can be installed or manufactured on vehicles. FIG. 1A depicts an example of a plurality of non-flat devices 110 (only one example non-flat device is referenced with an element number in FIGS. 1A-1B) installed on a lateral of an example vehicle 100. The non-flat devices 110 of FIG. 1A are installed in a grid pattern including a plurality of rows and columns that cover the majority of the surface area of the truck 100 on the lateral side. The pattern may include columns of non-flat devices 110 where each pair of consecutive columns are distanced closer to each other with a larger distance between the various pairs. Further, the consecutive columns are positioned such that they create slanted sides on the top and the bottom sides.

Each of the columns and/or rows may be in the form of strips containing a plurality of non-flat devices 110 that can be attached to the vehicle as a system. In some implementations, a strip may include a plurality of columns or rows. For example, pairs of consecutive columns may be provided on a single strip that can be applied to the body of the vehicle 100. As an example, each strip may include an adhesive material that can form an adhesive bond with the body of the vehicle 100. In alternative implementations, rows and/or columns of non-flat devices 110 are manufactured (e.g., stamped) directly on the body of the vehicle 100 and/or on attachments, fairings and accessories of the vehicle 100.

In some implementations, each of the non-flat devices 110 can be installed on the vehicle individually by using an adhesive material such as glue or any other type of material that can bind the flat surface of the non-flat device to the side of the vehicle. In some implementations, the non-flat devices are installed on the body of or are generated on the vehicle and/or on side skirts, accessories, fairings and/or attachments during the manufacturing process of the vehicle. In other implementations, the non-flat devices 110 are attached afterward the manufacturing process is completed in a desired pattern. Although only one side of the vehicle is shown in FIG. 1A, the non-flat devices 110 can be installed on any portion of the vehicle's body (e.g., both sides, top surface, and rear of the vehicle). Furthermore, the non-flat devices 110 do not need to cover the majority of the surface area of any side. For example, the devices may cover the entire surface area of the body of the vehicle 100 or they may be applied in segments. Any number of the non-flat devices 110 can be installed on the vehicle 100. However, use of a larger number of devices 110 and/or covering more of the surface area may result in a larger reduction in the wake and the force of drag, and as such, may result in better fuel and energy efficiency.

FIG. 1B depicts another example of a pattern in which a plurality of non-flat devices can be installed or manufactured on a lateral side of an example trailer 150. The non-flat devices 110 of FIG. 1A are installed in a diamond shaped grid pattern. Similar to the grid pattern of FIG. 1A, the diamond grid pattern of FIG. 1B includes a plurality of rows and columns that cover the majority of the surface area of the truck on the lateral side. However, in the diamond shaped grid pattern of FIG. 1B, the columns and rows that make up the pattern are distanced equally from each other. Similar to the non-flat devices of FIG. 1A, the pattern may be formed via strips of non-flat devices that take the form of one or more columns or rows or may be manufactured (e.g., stamped) directly on the body of the trailer 150 and/or on attachments, fairings and accessories of the trailer 150.

It should be noted that while FIGS. 1A-1B display diamond shaped grid patterns, non-flat devices can be installed or manufactured on a vehicle in any type of design or pattern. For example, even randomly placed non-flat devices installed or manufactured on a vehicle may decrease the amount of aerodynamic drag on the vehicle.

Figure 2B:
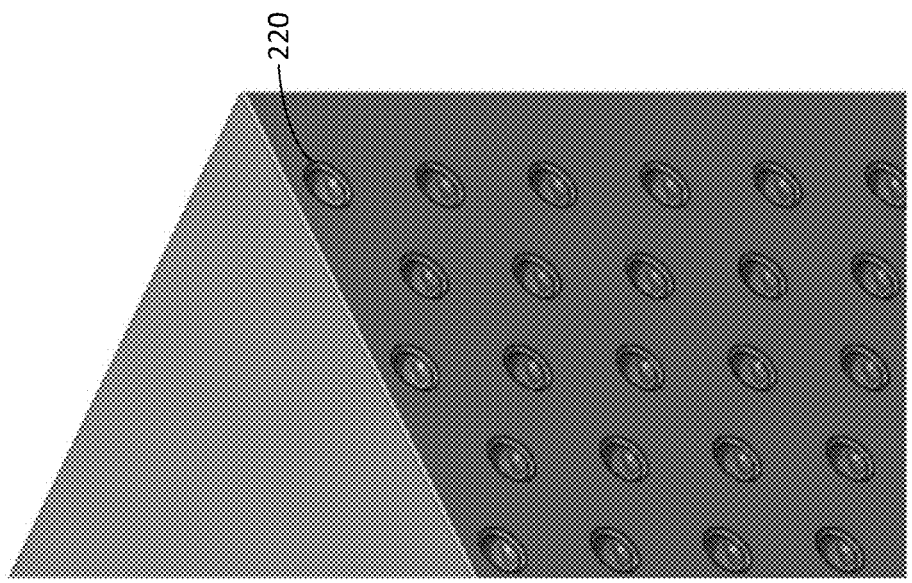
FIGS. 2A-2B depict examples of geometrical shapes of devices for reducing aerodynamic drag of ground vehicles, upon which aspects of this disclosure may be implemented.
Figure 2A:
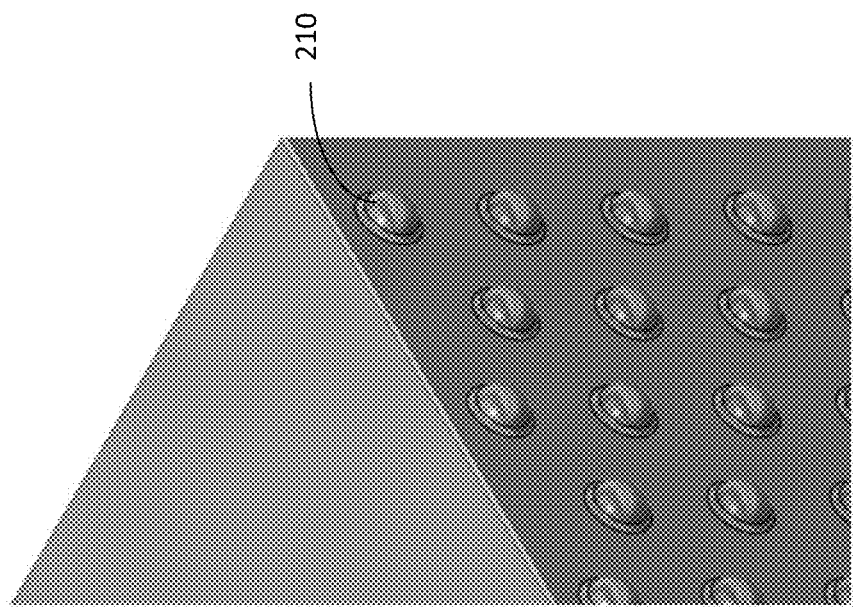

FIGS. 2A-2B depict example geometries for non-flat devices that reduce aerodynamic drag of a ground vehicle. FIG. 2A provides a zoomed-in view of non-flat devices 210 having protruding hemispherical shapes. As depicted in FIG. 2A, in some implementations, the non-flat devices take the form of a hemisphere having an upper curved body, and a bottom flat surface. The flat surface may be attached to the body of the vehicle such that, when installed, the devices have protruding convex shapes. In alternative implementations depicted in FIG. 2B, the curved side of the non-flat devices 220 may be attached to the vehicle body such that, when installed, the devices 220 have inverted concave shapes. In a third rendition, the non-flat devices may be manufactured so that they are concave on one side of the vehicle or aerodynamic attachment and convex on the opposite side of the surface of the vehicle or aerodynamic attachment. In this example, the protruding convex and inverted concave shapes are slightly more aerodynamically efficient.

Figure 3:
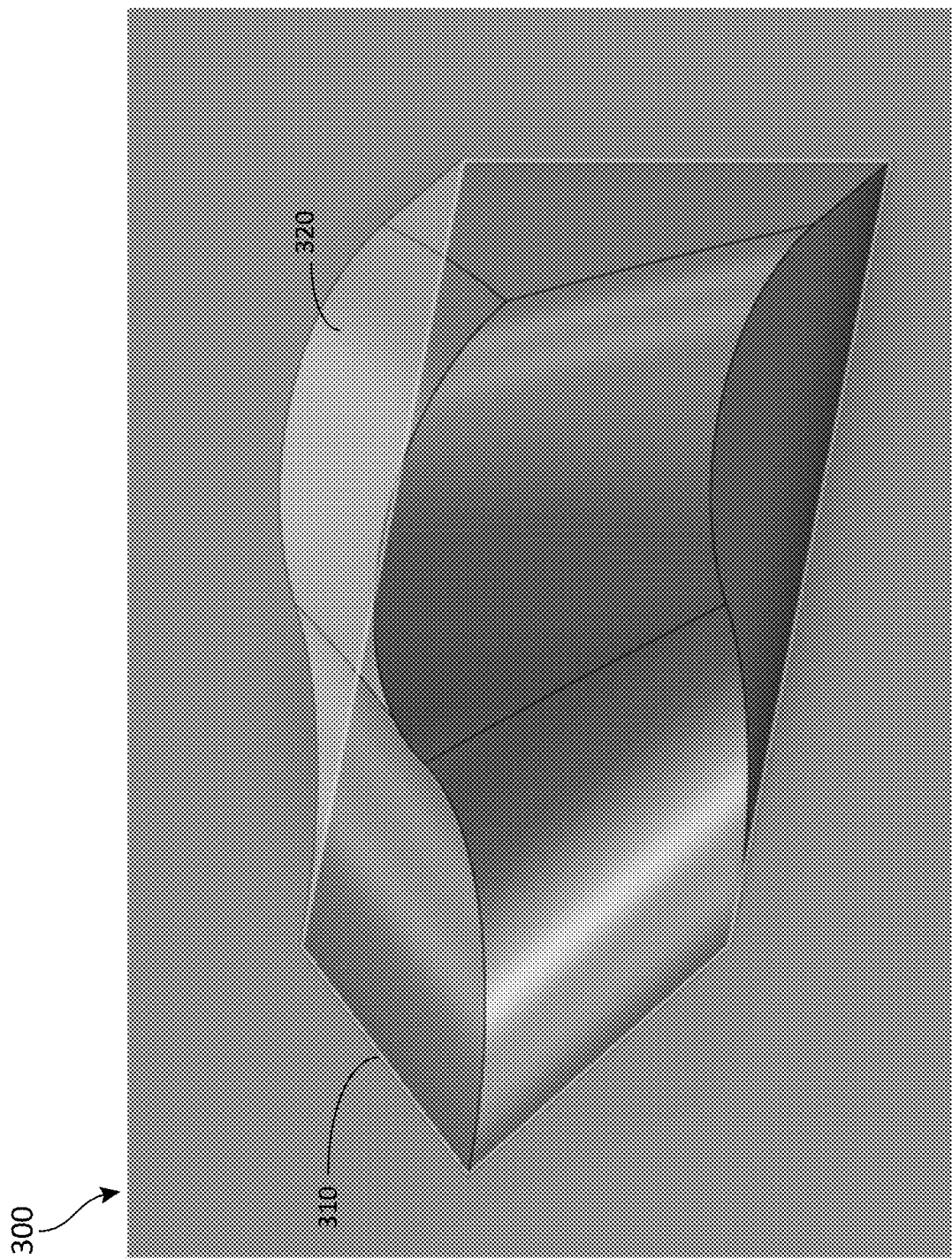
FIG. 3 depicts a side view of an alternative geometrical structure of devices for reducing aerodynamic drag of ground vehicles.

FIG. 3 depicts a side view of an alternative geometrical structure for the non-flat devices of the instant disclosure. The non-flat device 300 of FIG. 3 may have a shape resembling a wave. The wave-shaped geometry may include a flat surface 310 attached to one or more waved-shaped surfaces 320. The geometrical shape may be likened to an ancient battle helmet (e.g., the helmet depicted in the "Man in Armour holding a Pike" painting by Jan van Bijlert). The wavelike shaped devices 300 may be attached to the body of the vehicle by adhering the flat surface 310 to the body.

It should be noted that in addition to the geometrical shapes described herein, other non-flat devices may be utilized. For example, though not specifically described, the non-flat devices may take many shapes (e.g., leading and trailing edge shapes) and have varying widths, spacing and orientation of surfaces. Furthermore, they may be applied to many different types of vehicles and can have varied fabrication means, materials, and attachment mechanisms.

The concave or convex hemispherically shaped, wavelike shaped or other non-flat devices may cause the air streams surrounding the vehicle to constrict. This may pull the air streams closer to the sides of the vehicle and prevent them from separating from the body of the vehicle (e.g., trailer body). This may cause the air streams to travel upwards along the lateral end of the vehicle and turn inwards towards the rear of the vehicle. By turning the air streams inward behind the vehicle, an assistive push forward may be applied on the rear end of the vehicle. This may reduce the force of the wake in the rear of the vehicle and as such reduce the amount of energy required to push the vehicle forward.

Figure 4B:
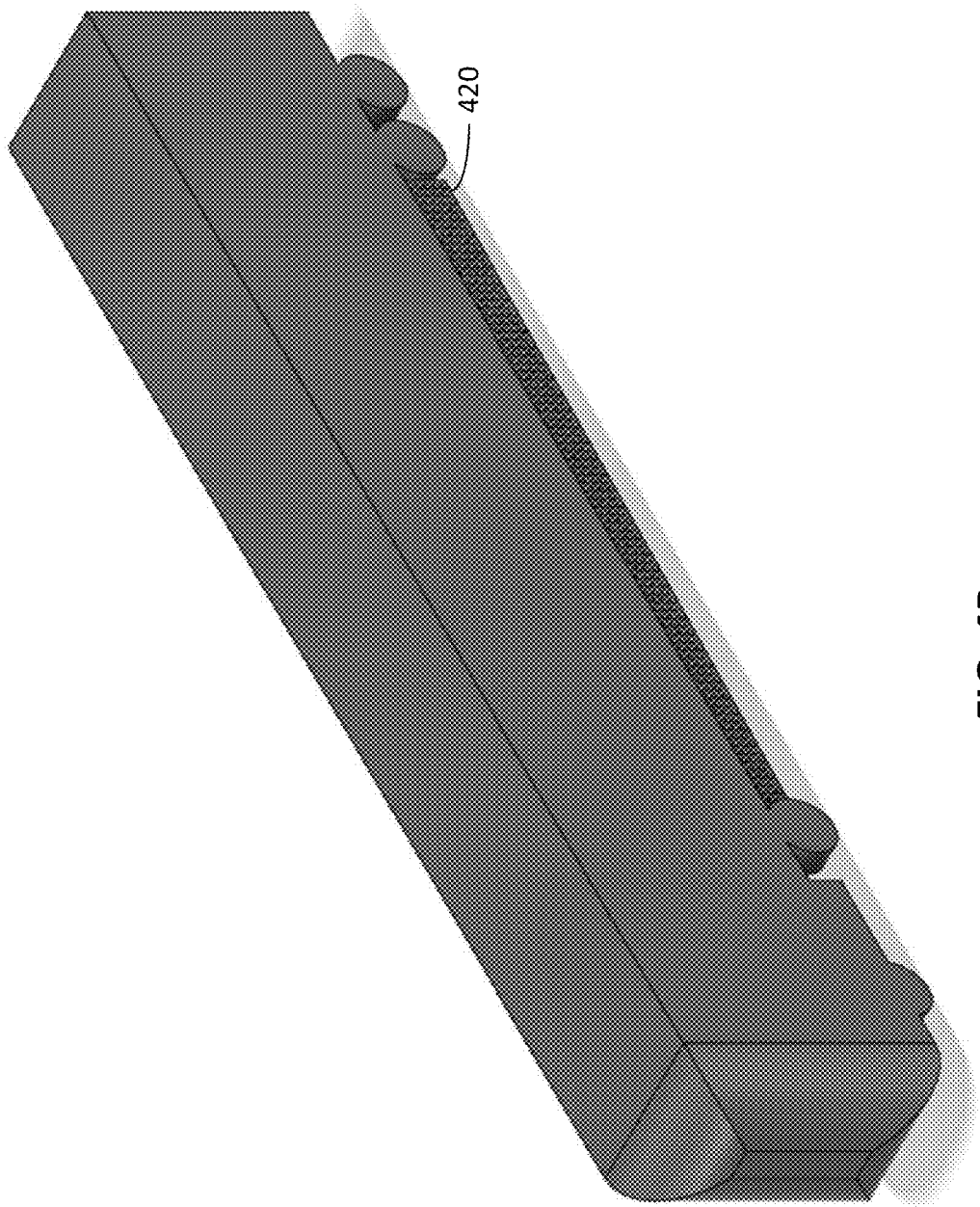

In addition to being attached to the body of the vehicle, the non-flat devices of the disclosure may be installed on various aftermarket vehicle accessories to reduce aerodynamic drag. FIGS. 4A-4B depict an example pattern in which curve-shaped devices can be installed on vehicle accessories. FIG. 4A illustrates a close-up view of a diamond-like grid pattern in which non-flat devices 410 can be installed on a side skirt 420, while FIG. 4B depicts a distant view of non-flat devices installed on the side skirt 420. The non-flat devices 410 may be installed on one or both side skirts in a variety of patterns. The example diamond-like grid pattern includes a plurality of rows and columns of non-flat devices 410 where the rows and columns are equally distanced and diagonally aligned. It should be noted that while a diamond-like grid pattern is illustrated, many different types of patterns may be used to apply the non-flat devices 410 to an aftermarket accessory such as the side skirt 420.

Use of the non-flat devices on after-market aerodynamic attachments such as the side skirt may optimize fuel and energy performance for multiple reasons. When attached to the sides of the vehicle, side skirts may allow for a large vortex to form on the side of the vehicle. The non-flat devices of this disclosure may cause the large vortex to be delayed in its formation and greatly reduced in size. This delay causes the air to stay closer to the body of the vehicle. Furthermore, the non-flat devices may cause a second premature vortex to form that can act as a shield to the large vortex. This may direct the air to travel more upwards, reconnecting with the surface of the vehicle, and breaking the wake into smaller sizes as it exits behind the vehicle. Moreover, the geometries of the non-flat devices installed on the side skirts may cause the air streams to travel upwards as they move towards the back of the vehicle. This leaves low pressure zones at the rear sides, causing the air below the vehicle to curl upwards behind the truck much closer to the rear of the vehicle than it otherwise would. This curling may provide an assistive push of air onto the back of the vehicle in the forward direction. Thus, the non-flat devices assist in reducing the wake and creating an assistive push forward.

When the invention is applied to a side skirt that is installed at an angle or tapered in, the vortices that are created may take a more lateral path along the side skirts. This effect may reduce the amount of friction along the side of the vehicle and create a more uniform path for the air to travel to be able to curl backwards and provide an assistive push. Thus, applying the non-flat devices on any side skirt can have beneficial effects.

Figure 5:
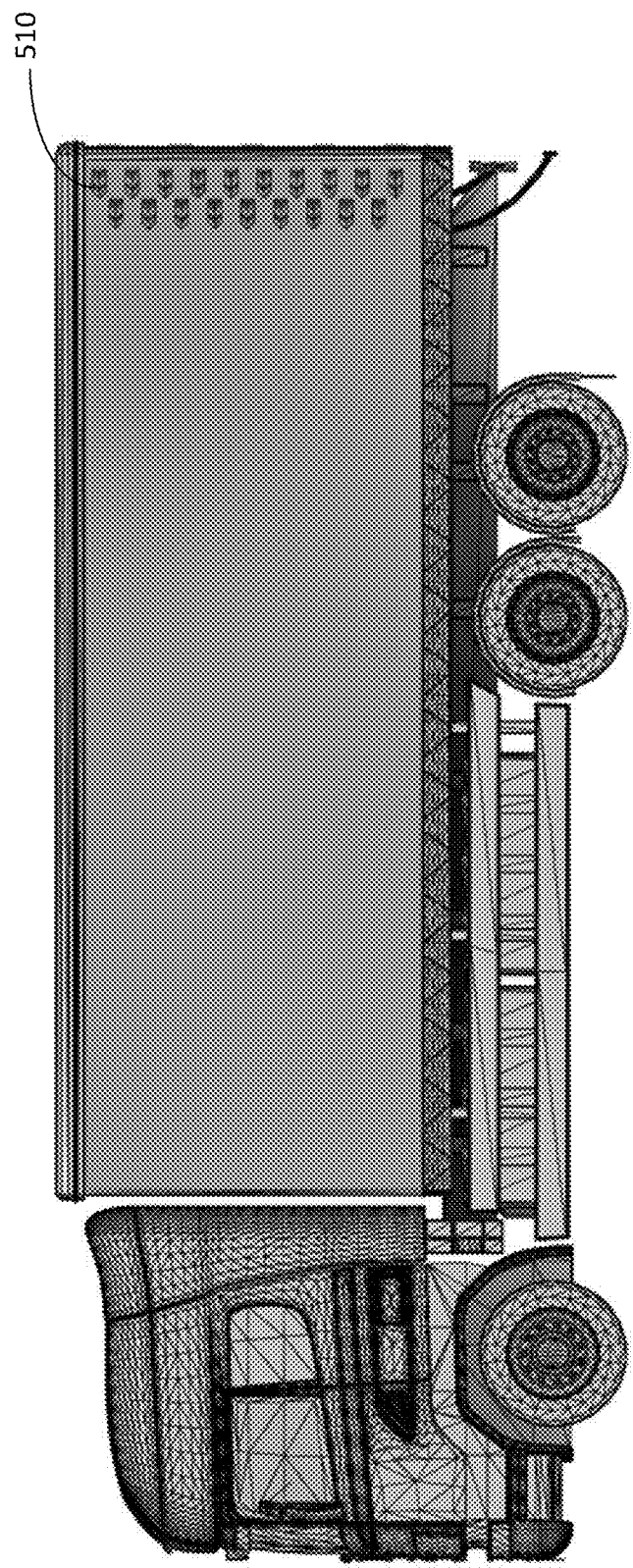
FIG. 5 depicts an example pattern in which non-flat devices having an alternative geometrical shape can be installed on the bodies of the vehicles.

FIG. 5 depicts an example pattern in which non-flat devices having an alternative geometrical shape can be installed on a body of the vehicle. The non-flat devices 510 of FIG. 5 are wave-like shaped (as depicted in FIG. 3). These devices 510 may be directly attached to the exterior body of a vehicle or may be attached to panels on the body of the vehicle in a similar manner as that discussed above with respect to hemispherical devices. For example, they may be installed in diamond-like grid patterns or any other patterns. Furthermore, they may cover the entire surface of one or more sides of the vehicle, or as depicted in FIG. 5, they may only be applied in small segments.

The non-flat devices disclosed herein may be mounted to the exterior body of the vehicle or affixed to existing aerodynamic attachments on the vehicle. In one implementation, the devices are affixed to the body of the vehicle as individual devices on the surfaces of the trailer body or as a system with a multiplicity of devices connected to one another on the surface of the trailer body. Both singular devices and systems are mounted in such a way to maintain a low profile so that they do not disturb regular operations such as opening of doors. For trailers carrying cargo or shipping containers, the non-flat devices may be attached to the body of the cargo or shipping container or may be attached as side skirts to the bottom of the cargo or shipping container.

For caravans (multiple trailers or multiple bodies such as train cars), the non-flat devices may be attached to the entire exterior surface of the vehicle, a segment of the exterior surface of the vehicle, or on aftermarket attachments of any or all trailers. As air passes along the non-flat devices, the air travels faster, and more uniform than it otherwise would, thus greatly reducing the aerodynamic drag experienced in the gap between the bodies as well as by the front of the subsequent body, itself.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for reducing an amount of aerodynamic drag generated within a vicinity of a moving vehicle, comprising:
   positioning or manufacturing a plurality of devices in a selected pattern on at least one of an exterior surface of the vehicle or a surface of an accessory attached to the vehicle,
   wherein:
      each of the plurality of devices includes a flat surface and one or more non-flat surfaces, and
      the plurality of devices cause an airstream traveling along a side of the vehicle to continue its trajectory unabated and curve behind the vehicle to provide a push in a forward direction.

2. The method of claim 1, wherein the vehicle has a trailer body and the plurality of devices are positioned on at least one side of the trailer body.

3. The method of claim 2, wherein the plurality of devices cover a majority of a surface area of the at least one side of the trailer body.

4. The method of claim 1, wherein the plurality of devices are positioned in a plurality of rows and columns.

5. The method of claim 1, wherein the pattern is a grid pattern.

6. The method of claim 1, wherein the pattern is a diamond shaped grid pattern.

7. The method of claim 1, wherein the pattern is a random placement of one or more of the plurality of devices.

8. The method of claim 1, wherein at least one of the plurality of devices has a hemisphere-like shape.

9. The method of claim 1, wherein at least one of the plurality of devices has a wave-like shape.

10. The method of claim 1, wherein the at least one of the one or more non-flat surfaces is a curve-shaped surfaces.

11. The method of claim 10, wherein the curve-shaped surface is approximated by using a plurality of flat surfaces.

12. The method of claim 1, wherein the accessory is at least one of a side skirt, panel, fairing, or an attachment.

13. The method of claim 1, wherein positioning the plurality of devices on at least one of an exterior surface of the vehicle or the surface of the accessory includes attaching a strip containing the plurality of devices on the at least one of an exterior surface of the vehicle or the surface of the accessory.

14. A system for reducing an amount of aerodynamic drag generated within a vicinity of a moving vehicle, comprising:
    a plurality of devices for attaching to or manufacturing on at least one of an exterior surface of the vehicle or a surface of a vehicle accessory attached to the vehicle, each of the plurality of devices comprising a flat surface and one or more non-flat surfaces, and the plurality of devices positioned in a pattern on the exterior surface of the vehicle,
    wherein the plurality of devices cause an airstream traveling along a side of the vehicle to continue its trajectory unabated and curve behind the vehicle to provide a push in a forward direction.

15. The system of claim 14, wherein at least one of the plurality of devices has a hemispherical shape.

16. The system of claim 14, wherein at least one of the plurality of devices has a wave-like shape.

17. The system of claim 14, wherein the vehicle accessory is at least one of a side skirt, panel, fairing, or an attachment.

18. The system of claim 14, wherein at least one of the one or more non-flat surfaces is a curve-shaped surface.

19. The system of claim 18, wherein the curve-shaped surface is approximated using a plurality of flat surfaces.

20. The system of claim 14, wherein the vehicle has a trailer body and the plurality of devices are positioned on at least one side of the trailer body.

* * * * *